(12) United States Patent
Srinivasan et al.

(10) Patent No.: US 9,864,900 B2
(45) Date of Patent: Jan. 9, 2018

(54) ENTROPY-REDUCING LOW PASS FILTER FOR FACE-DETECTION

(71) Applicant: Cisco Technology Inc., San Jose, CA (US)

(72) Inventors: Prabhakar Srinivasan, Bangalore (IN); Pete Rai, Egham (GB)

(73) Assignee: Cisco Technology, Inc., San Jose, CA (US)

( * ) Notice: Subject to any disclaimer, the term of this patent is extended or adjusted under 35 U.S.C. 154(b) by 689 days.

(21) Appl. No.: 14/453,967

(22) Filed: Aug. 7, 2014

(65) Prior Publication Data

US 2015/0379330 A1    Dec. 31, 2015

(30) Foreign Application Priority Data

Jun. 26, 2014   (IN) .......................... 1720/DEL/2014

(51) Int. Cl.
*G06K 9/00* (2006.01)
*G06K 9/46* (2006.01)

(52) U.S. Cl.
CPC ..... *G06K 9/00261* (2013.01); *G06K 9/00926* (2013.01); *G06K 9/4652* (2013.01)

(58) Field of Classification Search
CPC ........... G06K 9/00261; G06K 9/00926; G06K 9/4652
See application file for complete search history.

(56) References Cited

U.S. PATENT DOCUMENTS

| 7,594,177 B2 | 9/2009 | Jojic et al. |
| 7,787,665 B2 | 8/2010 | Nakashima |
| 9,275,285 B2 | 3/2016 | Srinivasan et al. |
| 2004/0090453 A1 | 5/2004 | Jasinschi et al. |
| 2005/0212913 A1 | 9/2005 | Richter |
| 2007/0286477 A1 | 12/2007 | Kim et al. |
| 2009/0285488 A1 | 11/2009 | Li |

(Continued)

FOREIGN PATENT DOCUMENTS

| EP | 2767930 | 8/2014 |
| WO | 2013/048162 | 4/2013 |

OTHER PUBLICATIONS

Hyobin Lee et al., "Face Detection Using Multi-Modal Features," Int'l Conference on Control, Automation and Systems 2008, pp. 2152-2155 (Oct. 17, 2008).

(Continued)

*Primary Examiner* — Chan Park
*Assistant Examiner* — Elisa Rice
(74) *Attorney, Agent, or Firm* — Samuel M. Katz (57) ABSTRACT

In one embodiment, a method for detecting faces in video image frames includes comparing a current image frame to a previously processed image frame to determine similarity, discarding the current image frame if the current image frame and the previously processed image frame are, detecting at least one detected facial image in the current image frame, comparing the at least one detected facial image to at least one most recently stored facial image stored in a most recently used (MRU) cache to determine similarity, discarding the at least one detected facial image if the at least one detected facial image and the at least one most recently stored facial image are similar; and storing the at least one detected facial image in the MRU cache if the at least one detected facial image and the at least one most recently stored facial image are not similar.

19 Claims, 5 Drawing Sheets

(56) References Cited

U.S. PATENT DOCUMENTS

| | | |
|---|---|---|
| 2010/0067745 A1 | 3/2010 | Kovtun et al. |
| 2012/0114172 A1 | 5/2012 | Du et al. |
| 2013/0148898 A1 | 6/2013 | Mitura et al. |
| 2014/0086450 A1 | 3/2014 | Huang et al. |
| 2014/0161326 A1 | 6/2014 | Ganong et al. |
| 2014/0226877 A1 | 8/2014 | Je et al. |
| 2016/0307029 A1 | 10/2016 | Vaknin et al. |

OTHER PUBLICATIONS

Phillip K. Poon et al., "Image Denoising With Singular Value Decomposition and Principal Component Analysis," (Dec. 8, 2009).

Yichuan Tang et al., "Robust Boltzmann Machines for Recognition and Denoising," (Jun. 16, 2012).

G. Vijaya et al., "A Simple Algorithm for Image Denoising Based on MS Segmentation," *Int'l Journal of Computer Applications*, vol. 2, No. 6, pp. 9-15 (Jun. 2010).

Jin Wang et al., "Fast Non-Local Algorithm for Image Denoising," *ICIP 2006*, pp. 1429-1432 (IEEE 2006).

"Cascade Classification; Haar Feature-Based Cascade Classifier for Object Detection," (Dec. 20, 2010).

Bradski, Gary et al.; Chapter 7: Histograms and Matching; In Learning OpenCV—Computer Vision with the OpenCV Library, Jan. 1, 2008, XP055291589, pp. 193-221.

Bradski, G. et al.; "Learning Computer Vision with the OpenCV Library"; Sep. 20, 2013; pp. 205-213.

Hsieh, Chen-Chiung et al; "Visual People Counting Using Gender Features and LRU Updating Scheme"; in Multimedia Tools and Applications, Kluwer Academic Publishers, Boston, US, vol. 74, No. 6, Sep. 20, 2013, pp. 1741-1759.

Schulte, Matthias; "Real-time feature extraction from video stream data for stream data segmentation and tagging", Jan. 22, 2013.

European Search Report in connection with European Application No. 15170986.2.

Examination Report issued by the European Patent Office dated Oct. 4, 2017 in corresponding application No. EP15170986.2.

Begin
　Init input_video
　Init MRUcache
　Init Frame=Frame$^0$
　for T in GetFrames(input_video)
　　if CheckSimilarity(Frame$^T$, NewFrame) is FALSE
　　　Frame=Frame$^T$
　　　Faces=ExtractFacesWithSubFeatures(Frame)
　　　for K in Size(Face)
　　　　if CheckSimilarityInCache(Faces$^K$, MRUCache) is FALSE
　　　　　AddToMRUCache(Faces$^K$)
End

FIG. 5

ENTROPY-REDUCING LOW PASS FILTER FOR FACE-DETECTION

FIELD OF THE INVENTION

The present invention generally relates to face detection, and particularly but not exclusively to face detection in video images.

CROSS REFERENCE

The present application claims the benefit of priority from IN Patent Application IN 1720/Del/2014 of Cisco Technology, Inc., filed Jun. 26, 2014.

BACKGROUND OF THE INVENTION

Face detection is a process by which the presence of a face is detected in a digital image. The results of the face detection process are often used as input to applications providing, for example, face recognition, animation or security. Face detection methods such as the Viola-Jones method employing Haar wavelets are well known in the art.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method for detecting faces in video image frames is implemented on a computing device and includes: comparing a current image frame to a previously processed image frame to determine similarity based on a threshold percent of deviance between the current and previously processed image frames; discarding the current image frame if the current image frame and the previously processed image frame are similar according to the comparing of image frames; detecting at least one detected facial image in the current image frame; comparing the at least one detected facial image to at least one most recently stored facial image stored in a most recently used (MRU) cache to determine similarity based on a threshold percent of deviance between said detected and most recently stored facial images; discarding the at least one detected facial image if the at least one detected facial image and the at least one most recently stored facial image are similar according to the comparing of facial images; and storing the at least one detected facial image in said MRU cache if the at least one detected facial image and the at least one most recently stored facial image are not similar according to the comparing of image frames.

A system for detecting faces in video image frames is implemented on at least one computing device and includes: a similarity checker operative to determine a degree of similarity between at least two images; a face detection module operative to at least detect a face in a digital image; a most recently used (MRU) cache; and a face detection server operative to filter out similar digital images based on the results of the similarity checker, to employ the face detection library to detect facial images in non-filtered images, and to store the facial images in the MRU cache.

Detailed Description of Example Embodiments

Face-detection functionality is available out-of-the-box from some image processing libraries, for example, OpenCV, originally developed by Intel Research and now supported by Willow Garage and Itseez. However, it will be appreciated that such functionality may have been developed originally for use with still images. Accordingly, such functionality may typically employ a "binary" approach: for a single given image, a face is either detected, or it is not. When such an approach is applied to broadcast video, the results may therefore be rather "noisy", with repeated redundant processing of similar recurring images within a video stream. Face detection for broadcast video may therefore suffer from a heightened state of entropy (vis-à-vis face detection for still images) as each noisy result, e.g. redundant images, false positives, etc., makes it progressively more difficult to isolate "true" results.

Figure 1:
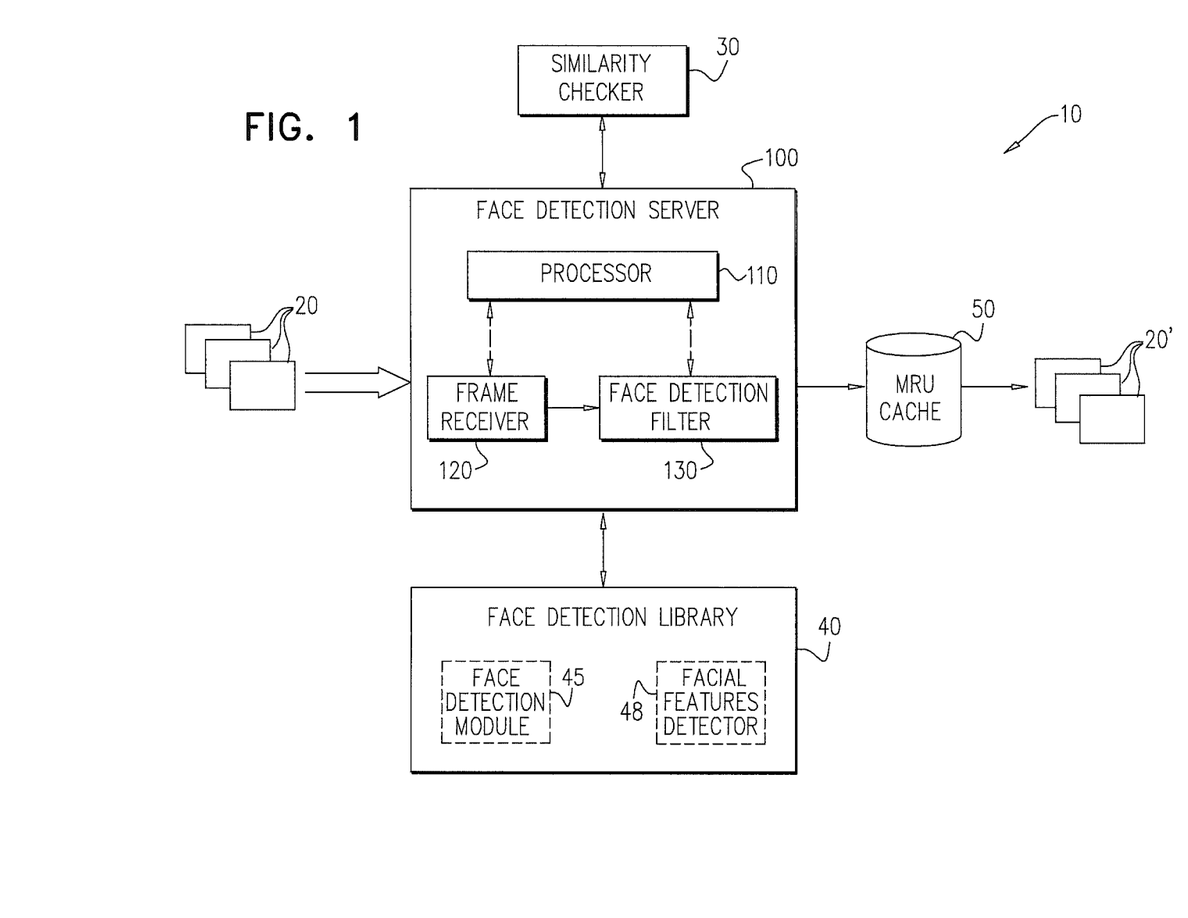
FIG. 1 is a simplified pictorial illustration of an entropy-reducing low pass filter system for face detection, constructed and operative in accordance with embodiments of the present invention.

Accordingly, the inventors of the present invention have realized that commonly available face detection functionality may require modification in order to provide more suitable processing of broadcast video. Reference is now made to FIG. 1 which illustrates an entropy-reducing low pass filter face detection system 10, constructed and operative in accordance with embodiments of the present invention. System 10 comprises face detection server 100, similarity checker 30, face detection library 40 and MRU (most recently used) cache 50. It will be appreciated that the depiction of similarity checker 30 and face detection library as independent modules may be exemplary. In some embodiments of the present invention, the functionalities of either similarity checker 30 and/or face detection library 40 may be implemented as one or more components of face detection server 100.

Face detection server 100 comprises hardware and software components, such as are well-known in the art. Face detection server 100 also comprises at least one processor 110 and frame receiver 120. It will be appreciated that face detection server 100 may comprise more than one processor 110. For example, one such processor 110 may be a special purpose processor operative to detect faces in a broadcast stream according to a method described herein. Processor 110 may be operative to execute instructions stored in a memory (not shown) in order to perform the herein described method to detect faces in a broadcast stream. Frame receiver 120 may be any hardware or software component operative to use protocols such as are known in the art to receive video frames 20 from a video stream. Non-limiting examples of frame receiver 120 may include a transceiver or a dedicated receiver. MRU cache 50 may be implemented with any suitable digital storage device operative to store digital images.

Figure 2:
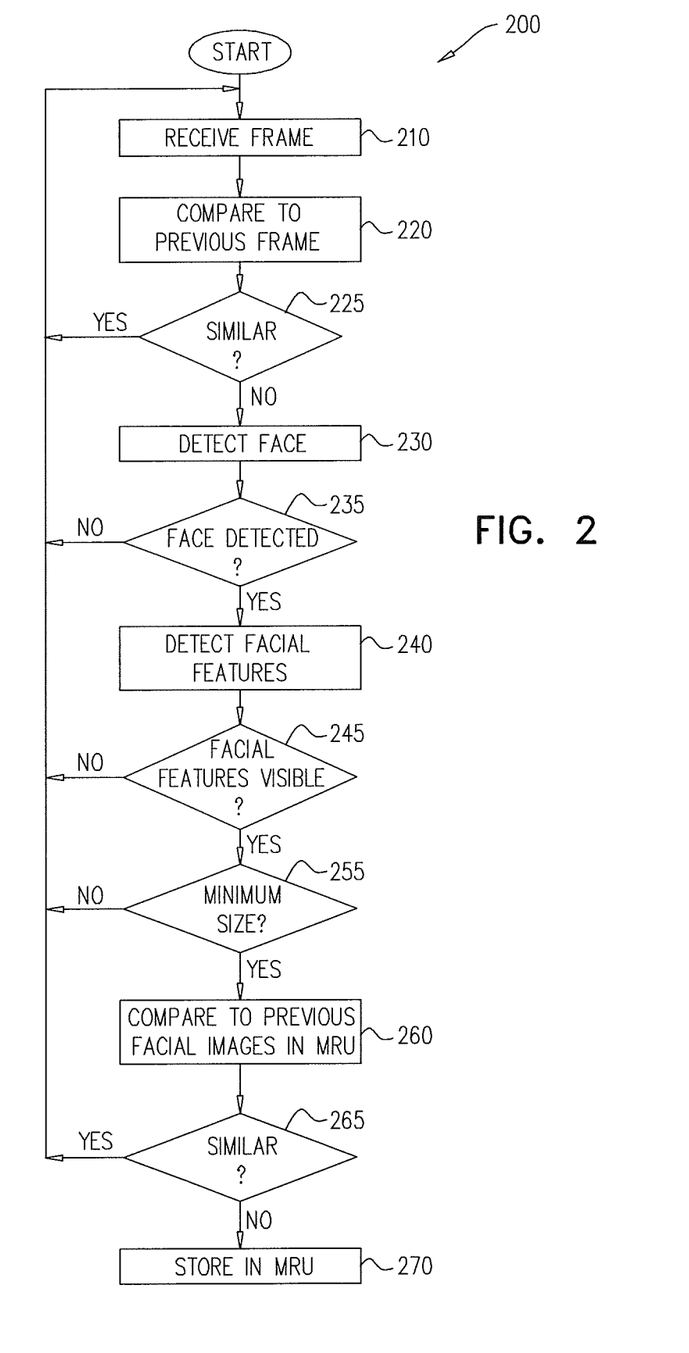
FIG. 2 is a block diagram of a process run by the system of FIG. 1.

Reference is now made also to FIG. 2 which illustrates an entropy-reducing low pass filtering process 200 to be performed by system 10 in accordance with embodiments of the present invention. Frame receiver 120 may receive (step 210) an image frame 20. It will be appreciated that frames 20 may be received from any suitable source. In accordance with an exemplary embodiment of the present invention, image frames 20 may be received from a video broadcast stream. It will be appreciated that image frames 20 may be received via other media as well, including, for example, DVD, tape cassettes and other forms of digital storage.

Face detection server 100 may also comprise face detection filter 130. Face detection filter 130 may be a hardware or software component operative to filter results of the face detection functionalities used by face detection server 100, thereby reducing entropy that may be inherent in using known methods for face detection for video broadcast images. Face detection filter 130 may invoke similarity checker 30 to compare (step 220) the image frame received in step 210 to a previous image frame received in step 210. It will be appreciated, that for the first pass through process 200, there may be no previous image frame to compare in step 220. It will also be appreciated that process 200 may not necessarily process each available image frame. For example, in a typical video broadcast stream, there may be twenty five image frames per second of video. Process 200 may be configured to process a sample of image frames, i.e. face detection filter 130 may be configured to process a configurable number of image frames per second. It will also be appreciated that some types of image frames may be better candidates for face detection. I-frames comprise full image data; whereas B-frames and P-frames may comprise only partial image data. Accordingly, in some embodiments of the present invention, process 200 may be configured to process only I-frames, or at least to favor the processing of I-frames over that of B-frames and P-frames.

It will similarly be appreciated that when processing video image frames, even if the camera shot remains steady and there is no movement of the actors, there may still be slight, immaterial differences between the images from frame to frame. For example, in the background, trees branches may be affected by the wind or the water in a river may be flowing. In such cases, while the images depicted may not be identical, there may be no material differences vis-à-vis the objective of face detection.

In accordance with embodiments of the present invention, similarity checker 30 may be operative to use color histograms to check the similarity of two or more given images. Accordingly similarity checker 30 may be a software or hardware component operative to convert the image frames 20 to color histograms in order to provide a quantifiable limit for material/immaterial differences. Alternatively, other techniques known in the art for determining if two images are similar may also be used by similarity checker 30. Comparison of color histograms is given by easy of example only.

Figure 3A:
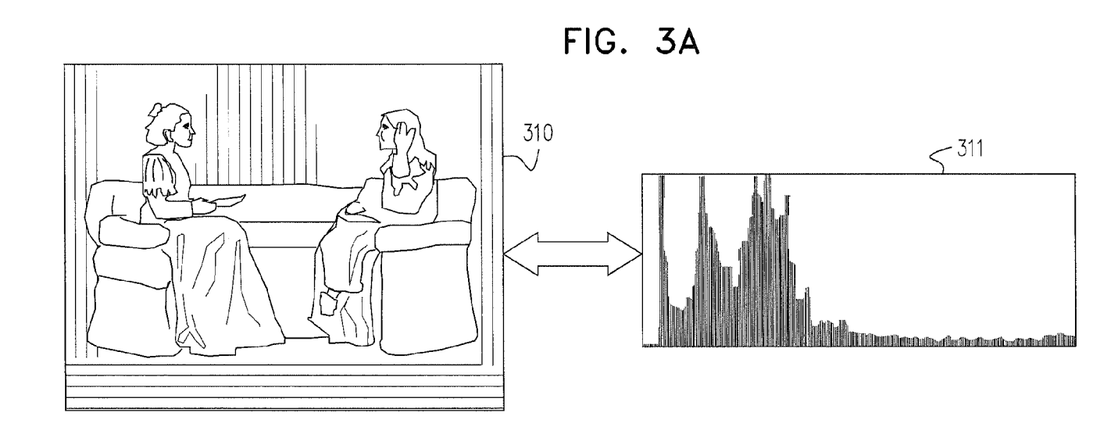
FIGS. 3A, 3B and 4 are illustrations of exemplary image data processed by the process of FIG. 2.
Figure 3B:
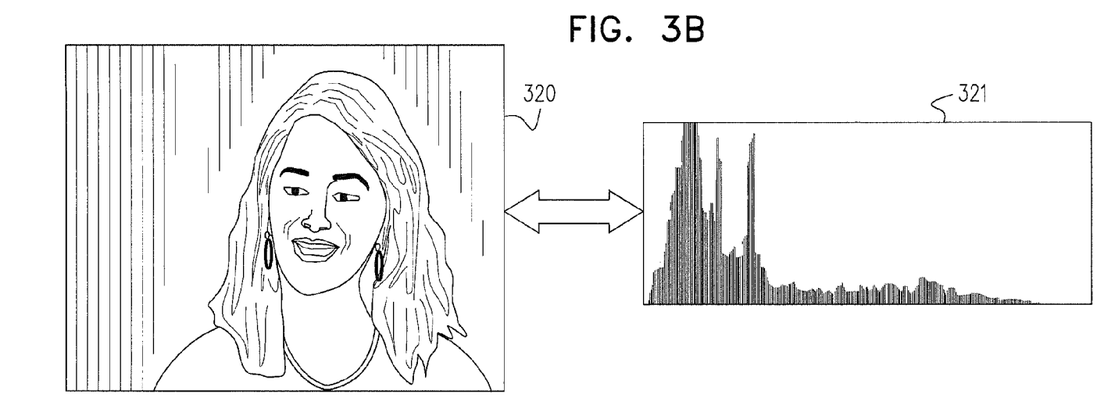

Reference is now made to FIGS. 3A and 3B which illustrate exemplary conversions of image frames 20 to color histograms for purposes of comparison. Image frames 310 and 320 depict two image frames 20 that may represent two images that may be produced in the context of a typical talk show. Image frame 310 depicts two women facing each other on a couch. Image frame 320 depicts a close-up of the woman on the right. It will be appreciated that for the purposes of face detection, the differences in size and pose between the images may render the images dissimilar even if the same women may be depicted in both images, as in FIGS. 3A and 3B.

Color histograms 311 and 321 represent exemplary color histograms generated from image frames 310 and 320 respectively. It will be appreciated that any known utility or suitable method may be used to generate color histograms 311 and 321. For example, an image processing library such as OpenCV may be employed to bin the pixel color intensities of the original images (i.e. image frames 310 and 320) into a hue saturation and luminosity color scheme to yield color histograms 311 and 321. It will be appreciated that while color histograms 311 and 321 are represented in FIGS. 3A and 3B in black and white, in practice they may also be differentiated by color.

It will also be appreciated that such color histograms may serve as a proxy for the original image frames, and as such may be quantifiably compared to determine whether the images from image frames 310 and 320 are similar. It will further be appreciated that a configurable limit may be defined to facilitate the determination of whether two given color histograms represent similar or dissimilar image frames 20. For example, similarity may be determined according to an average deviance between corresponding columns in the color histograms of FIGS. 3A and 3B. If the average deviance is greater than a threshold percentage, e.g. 1%, 5%, 10%, etc., then the image frames may be determined to be dissimilar. Alternatively or in addition, dissimilarity may be indicated by a more significant deviance in one or more individual columns, e.g. 25%, 40%, 50%, etc.

Returning to the discussion of FIG. 2, if the current image frame and the previous image frame are similar (step 225), i.e. there is no material difference between the two image frames, as determined by histogram analysis, described above with reference to FIGS. 3A and 3b, then there may be no need to process the current image frame any further. It may be assumed that if there is a face in the current image, then it was already detected when the previous image frame was processed. Similarly, if there is no face in the current image frame, then the previous image frame presumably also lacked a face. Accordingly, if the current image frame is similar to the previous image frame (step 225), then control may return to step 210.

If the current image frame is not similar to the previous image frame (step 225), then control may proceed to step 230. For example, assuming that FIG. 3A represents a color histogram conversion of a previous image frame 20 and FIG. 3B represents a color histogram conversion of a current image frame 20, the results of step 225 may be "No", that the images are not similar.

Face detection library 40 may comprise face detection module 45 and facial features detector 48. In accordance with embodiments of the present invention, face detection library 40 may be implemented with any known functionalities for face detection and the detection of facial features in an image. For example, face detection library 40 may be implemented using OpenCV, Python Imaging Library, Betaface or KeyLemon.

Face detection filter 130 may use face detection module 45 to detect (step 230) a face in the current image frame. If a face is not detected in the current image frame (step 235), control may return to step 210. Otherwise, if one or more faces are detected in the current image frame (step 235), process 200 may continue to step 240. It will be appreciated that depending on the configuration of face detection filter 130, non-human faces (e.g. animal faces or monster/alien faces from horror/science fiction movies) may or may not be detected as faces in step 235.

It will be appreciated that not all of the facial images detected in step 230 may be of the same utility for downstream uses. For example, a common downstream use may be to perform face recognition processing on the detected face to identify the person or persons in the image frame. The processing of partial face images, i.e. where one or more facial features may not be in the image, may generally yield poorer results than the processing of full facial images.

Accordingly, the output of process 200 may be improved by filtering out facial images without a complete set of facial features.

Face detection filter 130 may therefore employ facial features detector 48 to determine whether a facial image detected in the current image frame is missing any facial features. For example, facial features detector 48 may be configured to detect (step 240) whether a given facial image has at least two eyes, a mouth and two ears. If all the required facial features are not detected in a facial image (step 245), control may return to step 210. Otherwise, if one or more faces with a full set of facial features are detected in the current image frame (step 245), process 200 may continue to step 255. It will be appreciated that the configuration of facial features detector 48 as described hereinabove may be exemplary; the present invention may provide support for other configurations as well. For example, facial features detector 48 may be configured to It will similarly be appreciated that the quality of downstream processing or usage of a detected face may be at least in a part a function of the size of the detected face. Accordingly, face detection filter 130 may be configured to determine whether a given detected facial image is of a minimum size, i.e. that the detected facial image comprising a certain configurable number of pixels and/or that it meets configurable requirements for dimensions in terms of pixels. If face detection filter 130 determines that the current image frame does not comprise a facial image of a minimum size, control may return to step 210. Otherwise, if one or more faces of a minimum size are detected in the current image frame (step 255), process 200 may continue to step 260.

As discussed hereinabove, by comparing the current and previous frame as per steps 220 and 225, process 200 may filter out consecutive instances of generally similar image frames. However, steps 220 and 225 may not prevent repeated instances of generally similar image frames and/or generally similar detected facial images if they do not appear in consecutive image frames as the video stream is processed. For example, if two generally similar facial images appear in two different image frames separated by a third image frame with no facial images detected, then neither of the generally similar facial images may be filtered out by step 225.

In accordance with embodiments of the present invention, MRU cache 50 may be operative to store facial images that successfully pass through the filtering of process 200, i.e. facial images of at least a minimum size comprising a complete set of facial features. Before a current facial image may be stored in MRU cache 50, it may be compared to a previously stored facial image to filter redundant results.

Figure 4:
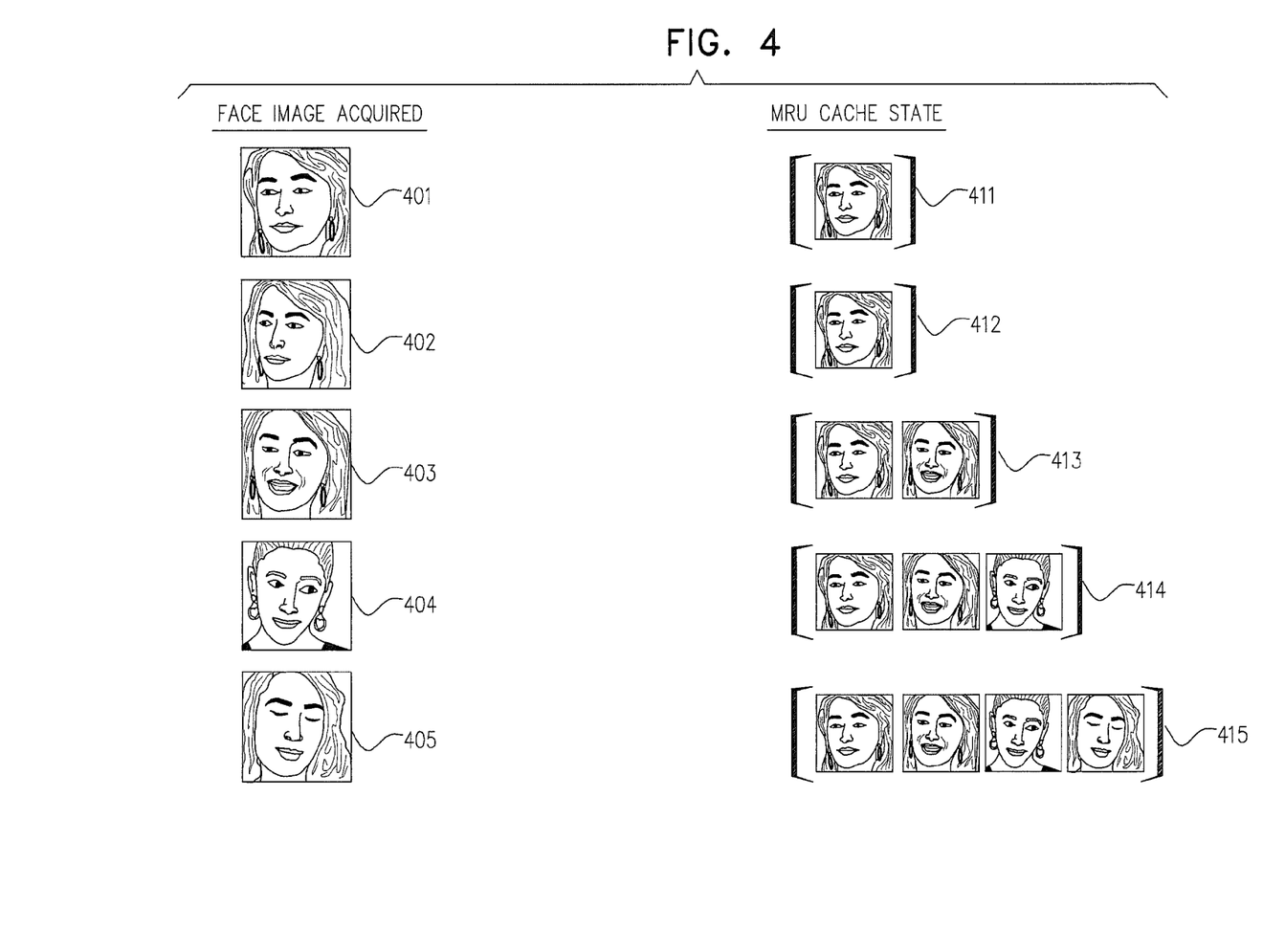

Reference is now also made to FIG. 4 which depicts, on the left side, a series of exemplary facial images processed by process 200 and, on the right side, the state of MRU cache 50 as each of the exemplary facial images may be processed. Face detection filter 130 may compare (step 260) a current facial image, such as, for example, facial image 401 with the most recent entry in MRU cache 50. It will be appreciated that step 260 may be performed in a generally similar manner as step 220, i.e. using color histograms and/or any other suitable method for comparing two digital images. If the current facial image is similar to the most recently entered facial image in MRU cache 50 (step 225), control may return to step 210. Otherwise, control may flow through to step 270.

In the example of FIG. 4, facial images 401, 402, 403, 404 and 405 may represent an exemplary sequence of five facial images to be processed by step 260. It will be appreciated that these exemplary facial images may or may not have appeared in consecutive image frames 20 processed by process 200; other image frames may have been filtered out in previous steps of process 200. Facial image 401 may be the first facial image processed. Accordingly, there may be no most recent entry in MRU cache 50 and face detection server 100 may store (step 270) facial image 401 in MRU cache 50. Accordingly, after process 200 processes facial image 401, MRU cache state 411 may represent the state of MRU cache 50.

It will be appreciated that facial image 402 may be generally similar to facial image 401; even though the depicted pose may be slightly different, the images may be sufficiently similar such that they do not pass the configured threshold percentage of deviation required to determine dissimilarity in step 260. Accordingly, when facial image 402 may be processed by step 265, control may return to step 210 and MRU cache 50 may not be updated; MRU cache state 412 may therefore be identical to MRU cache state 411.

Facial image 403 may represent yet a different pose of the same person depicted in facial images 401 and 402. However, it will be appreciated that the pose of facial image 403 may be significantly different than that of facial image 401, and that step 260 may compare whether or not the images are similar; not necessarily whether or not they depict the same person. Accordingly, step 260 may determine that facial images 403 and 401 are dissimilar and MRU cache 50 may be updated as per MRU cache state 413.

Facial image 404 as depicted represents a different person than that depicted in facial images 401, 402 and 403. Accordingly, MRU cache 50 may be updated as per MRU cache state 414. Facial image 405 may represent yet a different pose of the same person depicted in facial images 401, 402 and 403. Accordingly, MRU cache 50 may be updated as per MRU cache state 415.

In accordance with an embodiment of the present invention, face detection server 100 may periodically or episodically delete some or all of the contents of MRU cache 50 to remove the least recently used entries, thereby rendering filtered image frames 20. For example, after x iterations of process 200, some or all of the contents of MRU cache 50 may be deleted to remove facial image 401 from MRU cache state 415.

It will be appreciated that process 200 may be repeated until there are no more image frames 20 to process.

In accordance with some embodiments of the present invention, step 260 may include the comparison of a facial image to more than one recent entry in MRU cache. It will be appreciated that in such manner, the contents of MRU cache may be further filtered of redundant facial images.

Figure 5:
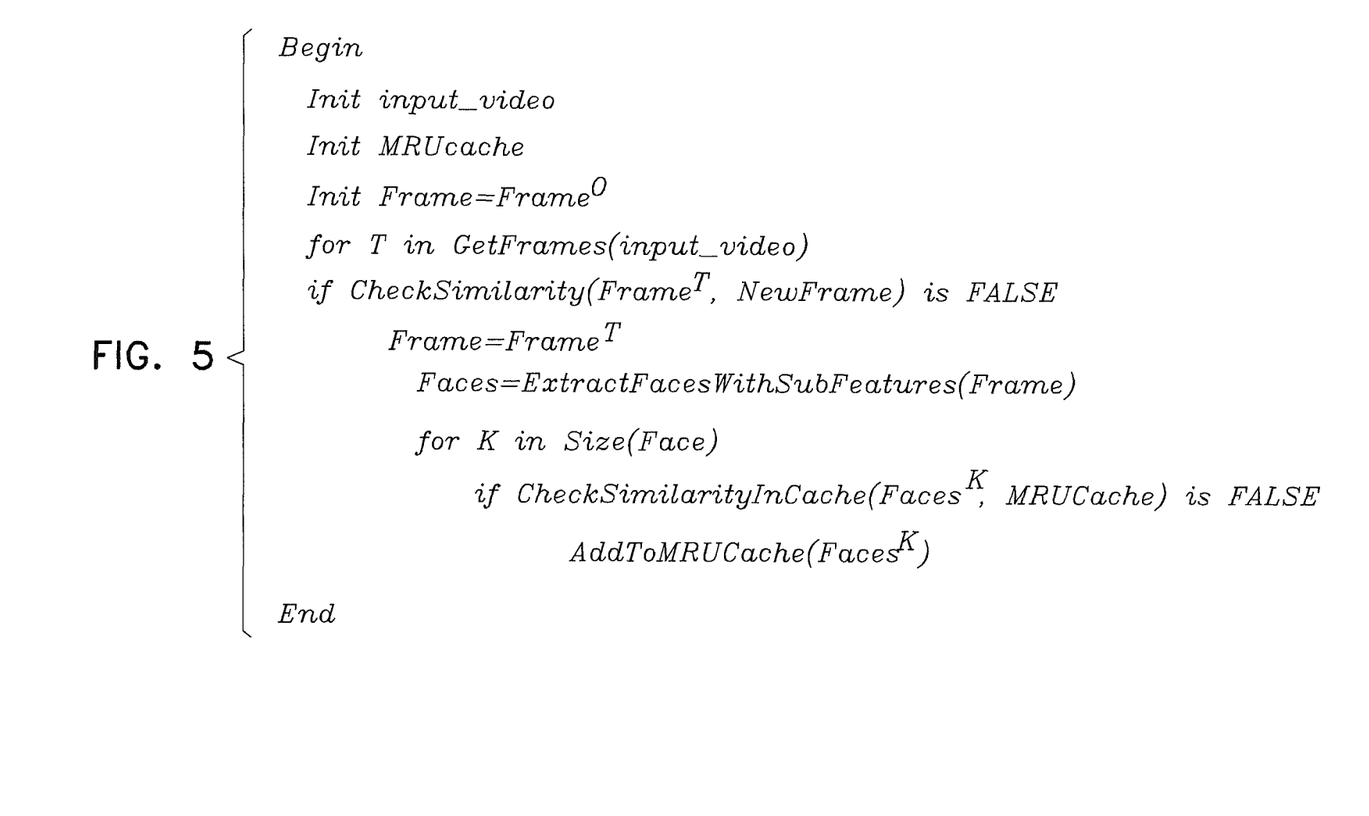
FIG. 5 is an illustration of pseudo code for an exemplary implementation of the process of FIG. 2.

Reference is now made to FIG. 5 which illustrates a listing of pseudo code for an exemplary implementation of process 200. As shown in FIG. 5, the input video stream, MRU cache 50 and a frame counter are initialized at the beginning of the process. Each image frame 20 received from the input video stream is compared to the previously received image frame 20. Non-similar image frames are processed to extract facial images with full sets of facial features. If the detected facial images are at least of minimum size, they may then be compared to one or more images in MRU cache 50. Non-similar facial images are then added to MRU cache 50.

It will be appreciated that the implementation of similarity checker 30 using color histograms for comparison may be exemplary. The present invention may provide support for any suitable method for comparing two digital images. For example, similarity checker 30 may also be implemented using other known methods such as, for example, SIFT (scale-invariant feature transform) or SURF (speeded-up robust features), or even methods for face recognition which may serve as a proxy for checking similarity.

It will be appreciated that the present invention may be leveraged to detect scene boundaries in a video stream. For example, multiple "no" results in steps 220 and/or 260 may indicate that the image frames being processed belong to a single ongoing scene. A spike in the rate of the turnover of the contents of MRU cache 50 may indicate that a new scene may be beginning. In accordance with an embodiment of the present invention, the flow-through rate of steps 220 and/or 260 may be monitored; a temporary increase in flow may indicate a scene boundary. Alternatively or in addition, the storage rate in MRU cache 50 may also be monitored in generally the same manner. Similarly, system 10 may detect scene boundaries based as a function of the combined flow-through rate for steps 220 and 260.

It will be appreciated that system 10 and process 200 as described hereinabove may provide an entropy-reducing solution for face detection in a video broadcast environment. When compared to typical face detection in a population of still images, system 10 may process a population of broadcast video images to achieve results with an improved ratio of quality to quantity, i.e. fewer facial images, but of higher quality, and with less false positive identifications. Accordingly, downstream applications processing the output of system 10 may receive more ordered, qualified and quality facial images for further processing.

It will similarly be appreciated that system 10 may be configured to reduce entropy at more than one level. For example, system 10 may reduce entropy at the signal level by filtering out similar, i.e. redundant, image frames in step 225 of process 200. System 10 may also reduce entropy at a metadata level through context-aware filtering. For example, system 10 may filter out lower quality facial images as per steps 245 and 255 of process 200. It will be appreciated that in some embodiments of the present invention, system 10 may be implemented as a central processing server, whereas downstream applications processing the output of system 10 may be distributed among multiple clients. For example, system 10 may be implemented as part of a video broadcast headend, and further processing of the output of system 10 may be performed at home client devices such as set-top boxes and other suitable computing devices operative to receive a video broadcast from the headend. It will therefore be appreciated that as a result of the improved quality/quantity ratio of the output from system 10, the home client devices downstream applications may require fewer resources to process the facial images detected by system 10.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for detecting faces in video image frames, the method implemented on a computing device and comprising:
    comparing a current image frame to a previously processed image frame to determine similarity based on a threshold percent of deviance between said current image frame and said previously processed image frame;
    upon determining that said current image frame and said previously processed image frame are similar according to said comparing, discarding said current image frame;
    upon determining that said current image frame and said previously processed image frame are not similar according to said comparing, detecting at least one detected facial image in said current image frame;
    comparing said at least one detected facial image to at least one most recently stored facial image stored in a most recently used (MRU) cache to determine similarity based on a threshold percent of deviance between said detected facial image and said most recently stored facial image;
    upon determining that said at least one detected facial image and said at least one most recently stored facial image are similar according to said comparing said at least one detected facial image to at least one most recently stored facial image, discarding said at least one detected facial image; and
    upon determining that said at least one detected facial image and said at least one most recently stored facial image are not similar according to said comparing said at least one detected facial image to at least one most recently stored facial image, storing said at least one detected facial image in said MRU cache.

2. The method according to claim 1 and also comprising:
    attempting to detect a complete set of visible facial features in said at least one detected facial image;
    and discarding said at least one detected facial image if said attempting is unsuccessful.

3. The method according to claim 1 and also comprising:
    discarding said at least one detected facial image if said at least one detected facial image is less than a threshold size.

4. The method according to claim 1 and wherein said comparing a current image frame to a previously processed image frame comprises:
    converting said current image frame to a color histogram; and
    comparing said color histogram to a color histogram produced by converting said previously processed image frame to a color histogram.

5. The method according to claim 1 and wherein said comparing at least one detected facial image to at least one most recently stored facial image comprises:
    converting said detected facial image to a color histogram; and comparing said color histogram to a color histogram produced by converting said at least one most recently stored facial image to a color histogram.

6. The method according to claim 1 and also comprising deleting least recently used contents of said MRU cache.

7. The method according to claim 6 and wherein said deleting is performed according to a schedule.

8. The method according to claim 6 and wherein said deleting is performed to enforce a maximum number of entries in said MRU cache.

9. The method according to claim 1 and also comprising providing facial images from said MRU cache to downstream applications.

10. The method according to claim 1 and also comprising detecting scene boundaries based on a lower rate for said discarding a current image frame.

11. The method according to claim 1 and also comprising detecting scene boundaries based on a higher rate for said said storing.

12. The method according to claim 1 and also comprising: sampling an input stream of said video image frames to select said current image frame.

13. The method according to claim 12 and wherein said sampling comprises selecting from among I-frames in said input stream.

14. A system for detecting faces in video image frames, the system implemented on a computing device and comprising:
means for comparing a current image frame to a previously processed image frame to determine similarity based on a threshold percent of deviance between said current image frame and said previously processed image frame;
means for discarding said current image frame if said current image frame and said previously processed image frame are similar according to said comparing;
means for detecting at least one detected facial image in said current image frame if said current image frame and said previously processed image frame are not similar according to said comparing of image frames;
means for comparing said at least one detected facial image to at least one most recently stored facial image stored in a most recently used (MRU) cache to determine similarity based on a threshold percent of deviance between said at least one detected facial image and said at least one most recently stored facial image;
means for discarding said at least one detected facial image if said at least one detected facial image and said at least one most recently stored facial image are similar according to said comparing said at least one detected facial image to at least one most recently stored facial image; and
means for storing said at least one detected facial image in said MRU cache if said at least one detected facial image and said at least one most recently stored facial image are not similar according to said comparing said at least one detected facial image to at least one most recently stored facial image.

15. The system according to claim 14 and wherein:
said means for detecting at least one detected facial image are operative to discard said at least one detected facial image, wherein a complete set of visible facial features is not detected for said at least one detected facial image.

16. The system according to claim 14 and wherein said system is operative to delete least recently used contents of said MRU cache.

17. The system according to claim 14 and wherein said means for comparing a current image frame are operative to convert said at least two images to color histograms.

18. The system according to claim 17 and wherein said means for comparing a current image frame are operative to determine said degree of similarity based on a threshold percent of deviance between said color histograms derived from said at least two images.

19. The system according to claim 14 and wherein said system is operative to discard said detected facial images below a threshold size.

* * * * *

UNITED STATES PATENT AND TRADEMARK OFFICE
CERTIFICATE OF CORRECTION

PATENT NO. : 9,864,900 B2
APPLICATION NO. : 14/453967
DATED : January 9, 2018
INVENTOR(S) : Prabhakar Srinivasan et al.

It is certified that error appears in the above-identified patent and that said Letters Patent is hereby corrected as shown below:

In the Specification

Column 1, Line 14, "1720/De1/2014" to read as -- 1720/Del/2014 --.

In the Claims

Column 9, Lines 18-19, in Claim 11, "said said" to read as -- said --.

Signed and Sealed this
First Day of May, 2018

Andrei Iancu
*Director of the United States Patent and Trademark Office*